United States Patent Office 2,722,522
Patented Nov. 1, 1955

2,722,522

BASING CEMENT

Angelo Simonelli, East Boston, Mass., assignor to General Electric Company, a corporation of New York; patent dedicated to the public insofar as it relates to lamps and lamp parts to the extent stated in document recorded in the U. S. Patent Office, January 4, 1954, Liber U-238, page 394

No Drawing. Application March 2, 1953, Serial No. 339,903

7 Claims. (Cl. 260—17.2)

My invention relates to a cement for bonding glass to articles of other materials such as metal or plastic for instance, and more particularly to a basing cement for attaching the base of an electric lamp or similar device to the glass envelope thereof.

Electric lamp bases are generally secured to the envelope of the lamp by means of a so-called basing cement. The conventional cement employed for this purpose comprises a paste-like mixture consisting essentially of an inert mineral filler such as marble flour, an insulating binder such as a thermosetting synthetic resin comprising a phenolic-aldehydic condensate product (such as Durite or Bakelite), one or more natural resins such as rosin and shellac, and a processing agent or solvent such as alcohol.

While such conventional basing cement compositions have proven entirely satisfactory for bonding brass-type bases to the glass envelopes of electric lamps and similar devices, it has been found that in the case of brass-plated steel bases and aluminum bases in particular, it is impossible to obtain with such conventional type cements, and to keep with any degree of regularity, the requisite cold and humidity bonding strength for the cement bonds between the glass envelope and the lamp base, the cement bonds possessing erratic and low strength under conditions of either low temperature or high humidity, or both.

It is an object of my invention to provide a basing cement which possesses a high bonding strength and which retains its bonding strength even when subjected to adverse conditions of low temperature or high humidity, or both.

Another object of my invention is to provide a basing cement which will afford a secure attachment of a glass article to either a brass-plated steel or an aluminum article and which will retain its bonding strength in such application under adverse conditions of either low temperature or high humidity, or both.

As previously mentioned, the conventional type basing cements ordinarily used for basing purposes in the electric lamp art are composed of an inert mineral filler material, an insulating binder, and a processing agent or solvent. Typical fillers which have been previously used are marble flour, ground mineral barites, and asbestos. The binder material may consist of one or more natural resins such as shellac and rosin, and one or more thermosetting synthetic resins. Various processing agents or solvents for the natural resins (i. e., shellac or rosin) may be used, the most common of which is alcohol.

Usually, such cements have incorporated therein a small amount of a curing indicator dye, such as malachite green, which changes color upon heating to thereby indicate, by the amount of color change which it undergoes, the degree of heat applied to the cement and therefore the extent of curing thereof.

The thermosetting synthetic resin preferably employed in such conventional basing cements is one, such as a phenol-furfural or a phenol-formaldehyde (Bakelite) resin, which consists essentially of a phenol-aldehyde. A composition comprising the product of condensation of phenol-furfural and formaldehyde to which has been added dibutyl phthalate, hexamethylene tetramine, benzoyl peroxide and wood flour, and known commercially as a "Durite" resin (manufactured by the Durite Plastics Division of the Borden Company) is used extensively as a binder in basing cements for electric lamps.

In accordance with the invention, I have discovered that by adding a small amount, for example from 3–6% by weight, of ordinary white granulated cane sugar to the conventional type basing cement compositions referred to above, a cement composition is produced which not only possesses high bonding strength but which, particularly when used to attach glass to a brass-plated steel or an aluminum article, will retain its said bonding strength under adverse conditions of either low temperature or high humidity, or both.

The total resin content in the basing cement, i. e., the total of the thermosetting synthetic resin and the natural resin (rosin and/or dry shellac), amounts to at least of the order of 13% by weight of the cement composition. Of this total resin content, preferably about half or slightly less than half thereof consists of thermosetting synthetic resin while the rest is composed of natural resin. For example, the thermosetting synthetic resin component may comprise approximately 6–7% by weight of the total cement composition while the natural resin component may comprise approximately 7–8% by weight of the cement. Preferably, both rosin and dry shellac are used in the cement composition to constitute the natural resin content thereof, the rosin preferably being present in an amount ranging from approximately 2½ to 3½% by weight of the cement and the dry shellac being present in an amount ranging from approximately 3½ to 4½% by weight of the cement.

The solvent which is employed for dissolving the natural resins (i. e., the dry shellac and rosin) and for imparting the required consistency to the cement, is present in an amount at least sufficient to completely dissolve the dry shellac and the rosin in the cement. Where denatured alcohol is employed as the solvent, the amount thereof ordinarily required to dissolve the shellac and rosin components of the cement, and to impart the required consistency thereto, will generally be of approximately the same weight as the shellac and rosin components. Thus, where the shellac and rosin respectively constitute approximately 4% and 3% by weight of the total cement composition, the amount of alcohol required for the above-mentioned purposes will amount to approximately 8% by weight of the cement.

The remainder of the cement composition, i. e., the portion thereof other than the resin, solvent and sugar components thereof, is composed essentially of an inert mineral filler, such as marble flour, which serves to fill the spaces between the resin particles of the cement. In general, this remainder of filler material ordinarily amounts to from approximately 71–78% by weight of the total cement composition.

When used, the amount of curing indicator dye incorporated in the cement is preferably as little as is necessary to effectively perform its intended function of indicating by color change the amount of heating and therefore the amount of curing of the cement. Where malachite green is employed as the curing indicator, the quantity thereof which need be incorporated in the cement to perform its intended function amounts to only a small fraction of a per cent, e. g., a few hundredths of a per cent by weight of the total cement composition.

A representative basing cement according to the invention consists essentially of the following materials in the indicated approximate proportions by weight:

| | Percent |
|---|---|
| Thermosetting phenolic-aldehydic resin | 6–7 |
| Rosin | 2½–3½ |
| Shellac (dry) | 3½–4½ |
| Sugar | 3–6 |
| Alcohol (denatured) | 7–8 |
| Marble flour | 71–78 (balance) |

A specific cement composition according to the invention which has been found to be particularly satisfactory is as follows:

| | |
|---|---|
| "Durite" or "Bakelite" resin | 7 lbs. |
| Rosin | 3½ lbs. |
| Shellac (dry) | 4½ lbs. |
| Marble flour | 85 lbs. |
| Sugar | 4–6 lbs. |
| Alcohol (denatured) | 4400 cc. (approx. 8 lbs.) |
| Malachite green | 12 grams |

In preparing a basing cement composition according to the invention, the formula quantities of dry shellac and rosin are first dissolved in a sufficient amount of the alcohol or other solvent to form a varnish solution or processing agent in which the rosin and shellac are in complete solution. The formula quantities of the powdered "Durite," "Bakelite" or other thermosetting synthetic resin and the marble flour are then thoroughly intermixed and the resulting powdered mixture then added to and mixed with the rosin-shellac solution along with the remainder of the alcohol solvent, until a smooth homogeneous mixture of proper consistency is formed. To obtain such proper consistency it may be necessary to use slightly more or less than the remaining formula quantity of the alcohol solvent.

What I claim as new and desire to secure by Letters Patent of the United States is:

1. A basing cement composition consisting essentially of at least one natural resin of the group consisting of rosin and dry shellac and a thermosetting synthetic resin consisting essentially of a phenol-aldehyde, the said resins together constituting at least of the order of 13% by weight of the composition, a sufficient amount of a solvent to completely dissolve the said natural resins, approximately 3–6% by weight of sugar, and the remainder consisting of an inorganic mineral filler material of the group consisting of marble flour, ground mineral barites, and asbestos.

2. A basing cement composition as set forth in claim 1 wherein the said inorganic filler material consists essentially of marble flour.

3. A basing cement composition consisting essentially of approximately 6–7% by weight of a thermosetting synthetic resin consisting essentially of a phenol-aldehyde, approximately 7–8% by weight of at least one natural resin of the group consisting of rosin and dry shellac, approximately 3–6% of sugar, and the remainder an inert mineral filler material of the group consisting of marble flour, ground mineral barites, and asbestos, said composition also containing a sufficient amount of solvent to completely dissolve the said nature resins.

4. A basing cement composition as set forth in claim 3 wherein the said filler material consists essentially of marble flour.

5. A basing cement composition consisting essentially of, by weight, approximately 6–7% of a synthetic resin consisting essentially of a phenol-aldehyde, approximately 3–4% of rosin, approximately 4–5% of shellac, approximately 71–78% of marble flour, approximately 3–6% of sugar, and sufficient alcohol to completely dissolve the said rosin and shellac.

6. A basing cement composition consisting essentially of, by weight, approximately 6–7% of a phenol-furfural resin, approximately 3–4% of rosin, approximately 4–5% of shellac, approximately 71–78% of marble flour, approximately 3–6% of sugar, and sufficient alcohol to completely dissolve the said rosin and shellac.

7. A basing cement composition consisting essentially of, by weight, approximately 6–7% of a phenol-formaldehyde resin, approximately 3–4% of rosin, approximately 4–5% of shellac, approximately 71–78% of marble flour, approximately 3–6% of sugar, and sufficient alcohol to completely dissolve the said rosin and shellac.

References Cited in the file of this patent

UNITED STATES PATENTS

| 2,633,457 | Hardwick | Mar. 31, 1953 |

FOREIGN PATENTS

| 18,393 | Australia | July 25, 1935 |